United States Patent [19]

Kamai

[11] Patent Number: 4,527,203
[45] Date of Patent: Jul. 2, 1985

[54] APPARATUS FOR REPRODUCING VIDEO AND AUDIO SIGNALS

[75] Inventor: Toshimitsu Kamai, Higashikurume, Japan

[73] Assignee: Sony Corporation, Tokyo, Japan

[21] Appl. No.: 467,855

[22] Filed: Feb. 18, 1983

[30] Foreign Application Priority Data

Feb. 19, 1982 [JP] Japan ................................. 57-25730

[51] Int. Cl.³ ........................................... H04N 5/782
[52] U.S. Cl. .................................................. 360/19.1
[58] Field of Search .................... 360/19.1, 23, 27, 28, 360/33.1, 22, 9.1, 10.1, 10.2, 10.3, 20; 358/343, 310, 335, 341, 143, 144, 145; 369/14, 15, 48, 49, 86, 89, 124, 128, 30, 32, 77.1, 77.2, 47

[56] References Cited

U.S. PATENT DOCUMENTS 4,013,841 3/1977 Ohkubo et al. ...................... 369/49
4,390,906 6/1983 Furumoto et al. .................. 360/19.1
4,445,151 4/1984 Kinoshita et al. ..................... 360/27

Primary Examiner—Donald McElheny, Jr.
Attorney, Agent, or Firm—Lewis H. Eslinger; Alvin Sinderbrand

[57] ABSTRACT

A video and audio signal reproducing apparatus comprises an audio signal processing circuit which reproduces at least one audio signal recorded in at least one longitudinally disposed track on a magnetic recording medium, a mixed signal processing circuit which reproduces the audio signal from first and second mixed audio and video signals recorded in first and second adjacent slant tracks, respectively, on the magnetic recording medium, and a detecting circuit which detects when the audio signal is included in the signals recorded in the slant tracks on the magnetic recording medium and which selects the audio signal from the mixed signal processing circuit when the audio signal is reproduced thereby and which selects the audio signal from audio signal processing circuit at all other times.

21 Claims, 12 Drawing Figures

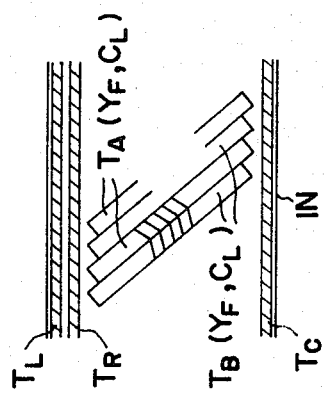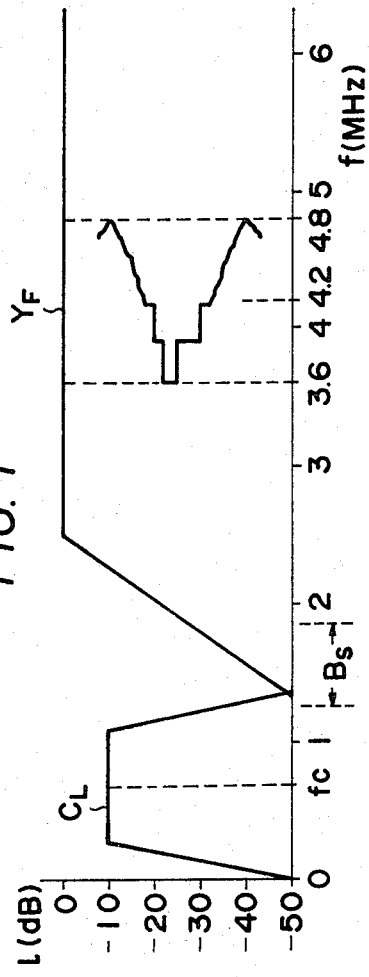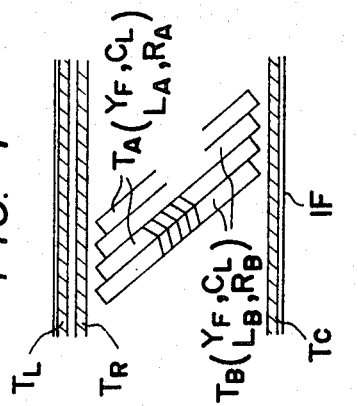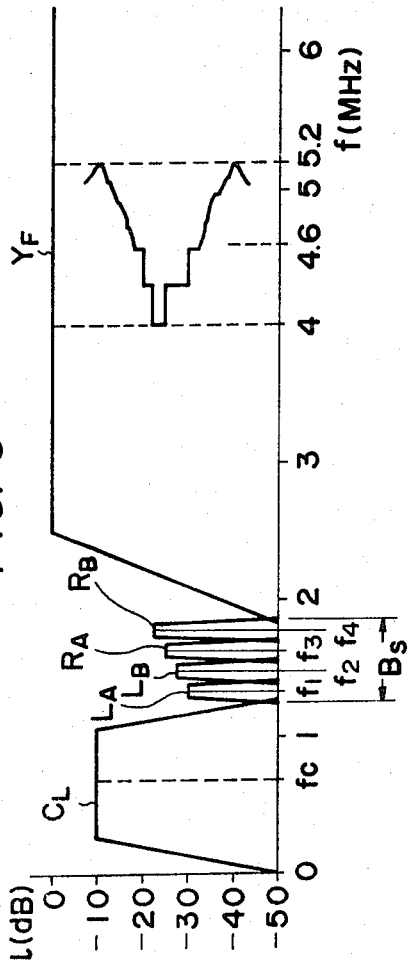

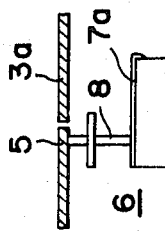
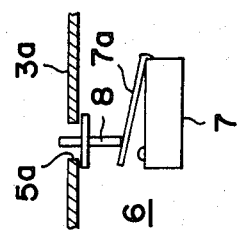
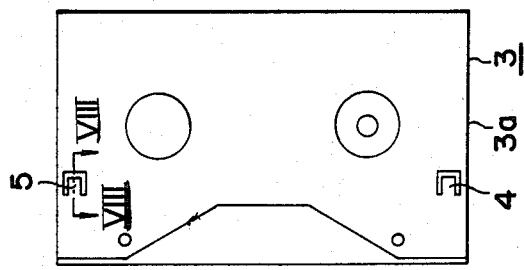
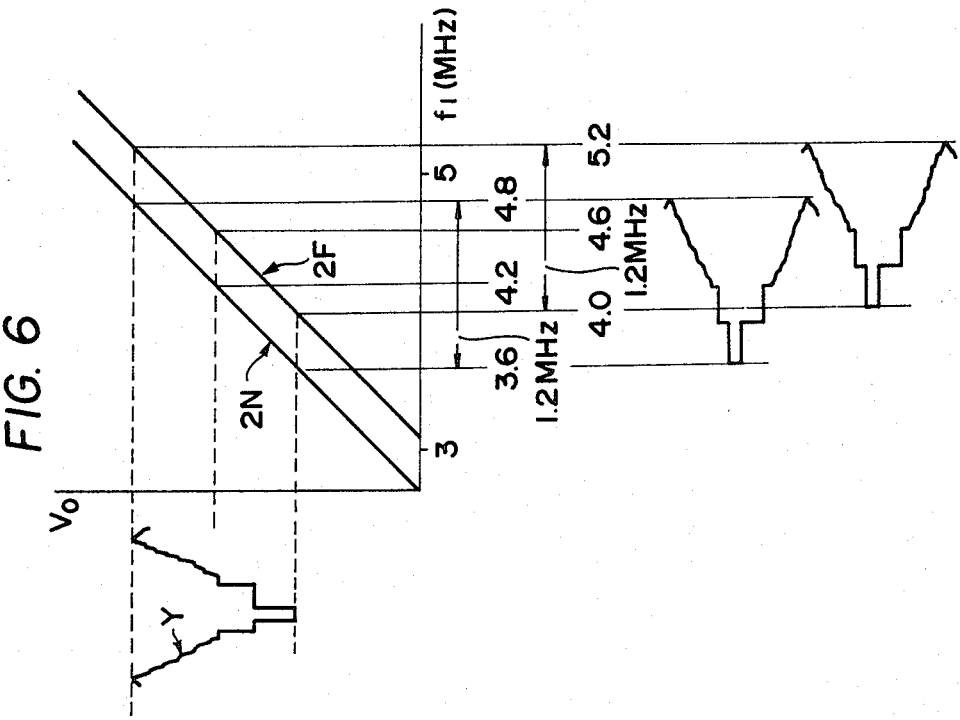

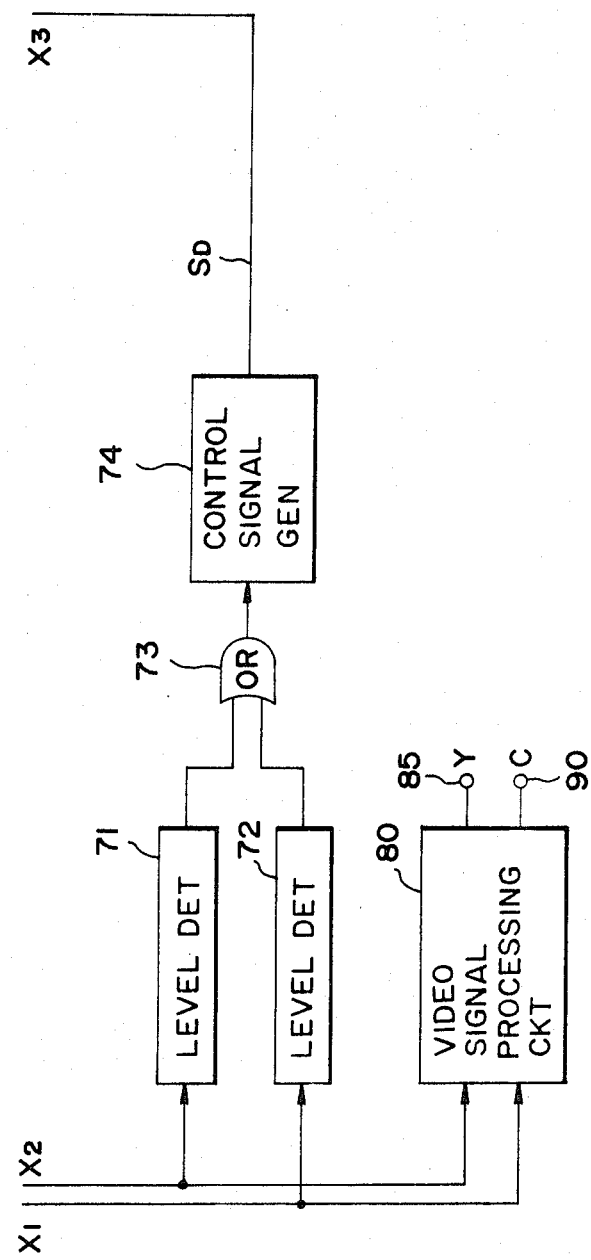

APPARATUS FOR REPRODUCING VIDEO AND AUDIO SIGNALS

BACKGROUND OF THE INVENTION

1. Field of the Invention

This invention relates generally to an apparatus for magnetically recording and/or reproducing video and audio signals, such as may constitute a television signal, and more particularly is directed to improvements in the recording and/or reproducing of the audio signal in such an apparatus.

2. Description of the Prior Art

In the video tape recorders according to the prior art for recording a color television signal on a magnetic tape, the chrominance and luminance signal components which constitute the color video signal are separated, and the chrominance signal component has its carrier frequency converted to a relatively low value, while the luminance component frequency modulates a relatively high frequency carrier, whereupon the frequency-converted chrominance signal component and the high side band of the frequency-modulated luminance signal component (hereinafter simply referred to as the "FM modulated luminance signal component") are mixed or combined to form a composite color video signal which is recorded on a magnetic tape in successive, parallel record tracks extending obliquely in respect to the longitudinal or running direction of the magnetic tape. In such existing system for recording a color television signal, the audio signal thereof is recorded on the magnetic tape in record tracks which extend in the longitudinal direction, that is, the running direction of the magnetic tape, and are hereinafter referred to simply as "audio tracks".

In the above-described recording system of the prior art, the oblique or slant tracks which are skewed relative to the tape and in which the composite color video signal, that is, the frequency-converted chrominance signal component and the frequency-modulated luminance signal component, are recorded by first and second substantially diametrically opposed rotary magnetic heads both supplied with the composite color video signal and alternately scanning the magnetic tape along a path at an angle to the longitudinal direction in which the tape is transported. In order to increase the recording density of the color video signal on the tape and thereby increase the duration of the recording, it has been known to restrict the speed at which the magnetic tape is transported so that the successive slant tracks scanned by the rotary magnetic heads will be closely or immediately adjacent to each other, that is, so that the space or so-called guard band between the adjacent slant tracks will be eliminated. However, in such case, the problem of "cross talk" arises in the reproducing or playback mode of the apparatus. In other words, during reproducing or playback, a transducer or head scanning one of the slant tracks for reproducing the composite color video signal recorded therein will also pick up or reproduce signals or cross talk from the next adjacent tracks.

The problem of cross talk has been substantially solved, at least in respect to the relatively high frequency frequency-modulated luminance signal component of the recorded composite color video signal, by providing the first and second rotary magnetic heads with different azimuth angles so that the composite color video signal will be recorded in each slant track by means of a magnetic head having an azimuth angle different from the azimuth angle of the head with which the composite color video signal is recorded in the next adjacent tracks. Thereafter, during reproducing or playback, each slant track is scanned by the rotary magnetic head having the corresponding azimuth angle with the result that a substantial azimuth loss is experienced as to the relatively high frequency components for the cross talk from the adjacent tracks. Thus, the cross talk in respect to the frequency-modulated luminance signal component is substantially suppressed.

However, the azimuth loss effect is rather poor in respect to the low frequency band of the cross talk, that is, in respect to the frequency-converted chrominance signal component, so that other measures need to be taken for eliminating or minimizing the low-frequency component of the cross talk. For example, as disclosed in detail in U.S. Pat. No. 4,007,482, issued Feb. 8, 1977, and having a common assignee herewith, cross talk in respect to the frequency-converted chrominance signal component situated in a relatively low frequency band is substantially eliminated by recording the chrominance signal component with different first and second carriers in the adjacent tracks, respectively. Such first and second carriers modulated by the chrominance signal component recorded in adjacent tracks, respectively, may be distinguished from each other by their respective frequency and/or polarity characteristics so that, upon reproduction of the signal recorded in a particular track, the low frequency band of the cross talk from the track, the low frequency band of the cross talk from the tracks next adjacent thereto can be conveniently suppressed or eliminated by reason of the different frequency and/or polarity or phase characteristics of the respective carriers.

More specifically, as disclosed in the above-identified patent, the chrominance signal component of the color video signal to be recorded may be frequency-converted so as selectively to produce first and second frequency-converted signals which, when considered instantaneously, have the same carrier frequency, but which differ from each other in their phase or polarity characteristics. In this case, each of the line areas or increments of one track may have recorded therein a frequency-converted chrominance signal component with a carrier of constant polarity, while, in the next adjacent tracks, the carrier of the frequency-converted chrominance signal component recorded therein reverses its polarity for successive line intervals. Such pattern of recording insures that, during playback or reproduction, cross talk effects can be minimized or eliminated. For example, during reproduction of the recorded signals, the reproduced signals of two successive line intervals may be added together by means of suitable delay means, for example, by a simple comb filter, to cancel out, or at least minimize cross-talk interference signals associated with the desired reproduced signals of the two successive line intervals.

However, in the above-described system for recording and reproducing a color television signal, each of the audio signals thereof, for example, the stereophonic left and right signals, is supplied to a respective fixed head which is continuously in contact with the magnetic tape adjacent a longitudinal edge of the latter so that the stereophonic left and right signals are respectively recorded in audio tracks extending longitudinally along the magnetic tape.

It will be appreciated that, when high density recording of the color video signal in successive slant tracks on the tape is effected as described above, the rotational speed of the rotary magnetic heads is relied upon to provide the desired relatively high speed of each rotary magnetic head in respect to the magnetic tape for ensuring high quality recording of the color video signal in the slant or skewed tracks. However, for achieving the high density recording of the color video signal, the transport speed of the magnetic tape is necessarily quite low, for example, about 1.33 cm/sec. Thus, the relative velocity between the magnetic tape and the fixed heads which record the audio signals in the respective audio tracks is quite low with the result that the quality of the audio recording is deteriorated.

In order to solve the above problem associated with the recording of the audio signals, it has been proposed that the audio signals be frequency-modulated and then mixed with the composite color video signal to provide a mixed or combined signal supplied to the rotary magnetic heads for recording by the latter in the slant tracks. Although the foregoing proposal ensures that the relative speed of the rotary magnetic heads in respect to the magnetic tape will be sufficient to ensure that the recording quality of the audio signals will not be deleteriously affected by an inadequate head-to-tape speed, the reproduced audio signals are still of insufficient quality. More particularly, in the existing proposal for recording frequency-modulated audio signals along with the composite color video signal in the slant tracks on the magnetic tape, the frequency-modulated audio signals recorded in the next adjacent tracks have the same carrier frequency. Therefore, each audio signal reproduced from a particular track contains a zero beat interference due to the audio component of the cross talk from the adjacent tracks even though the level of such cross talk may be reduced by the previously mentioned azimuth loss.

When the audio signals are recorded in the longitudinal tracks on the magnetic tape and also frequency-modulated and mixed with the composite color video signal and recorded in the slant tracks, a reproducing machine must detect the presence of the frequency-modulated audio signals and select them for reproduction. Also, in certain instances, the frequency-modulated audio signals cannot be reproduced from the composite color video signal due to, for example, a drop-out or the like. Since the audio signals are also recorded in the longitudinal track, the reproducing device can reproduce the audio signals therefrom in such an instance and no gap or silence will occur in the reproduced audio signal insofar as the listener or viewer is concerned.

It is important that magnetic tape having the audio signals recorded in the slant tracks be compatible with existing video tape recording and/or reproducing apparatuses which can only reproduce audio signals from the longitudinally disposed tracks. Accordingly, the audio signals must be recorded in both the longitudinal tracks and in the slant tracks so that the magnetic tape can be used with existing video tape recording and/or reproducing apparatuses and video tape recording and/or reproducing apparatuses especially built to reproduce the FM audio signals.

It is sometimes desirable to perform an "audio dubbing" operation with respect to a recorded audio signal, in which an audio signal is recorded later over an existing audio signal. When the audio signals are frequent modulated and mixed with the composite color video signal, it is not possible to perform such a dubbing operation with such mixed signals. Thus, any audio dubbing must be performed with respect to the audio signals recorded in the longitudinal tracks on the magnetic tape.

OBJECTS AND SUMMARY OF THE INVENTION

Accordingly, it is an object of the present invention to provide an apparatus for reproducing video and audio signals and which avoids previously described problems associated with the apparatus of the prior art.

More specifically, it is an object of the present invention to provide an apparatus for reproducing video and audio signals which is capable of detecting when a frequency modulated audio signal is included in the composite video signal.

Another object of the present invention is to provide an apparatus, as aforesaid, which can record and reproduce plural channels of audio signals, for example, stereophonic left and right signals, of a high quality.

Still another object of the present invention is to provide an apparatus, as aforesaid, which will automatically reproduce frequency-modulated audio signals when they are included in the composite video signal, even though audio signals are recorded in conventional longitudinally disposed tracks on the magnetic tape.

A still further object of the present invention is to provide an apparatus for indicating when a frequency modulated audio signal is included with the composite video signal whereby an apparatus for reproducing video and audio signals, as aforesaid, can select the frequency modulated audio signals for reproduction.

Yet another object of the present invention is to provide an apparatus for reproducing video and audio signals, as aforesaid, which will generate a control signal to a video processing circuit whereby the video processing circuit can accurately process the composite video signal recorded on the magnetic tape.

It is still a further object of the present invention to provide an apparatus, as aforesaid, which is compatible with existing video tape recordings with the audio signals recorded in longitudinally disposed tracks and with video tape recordings with the audio signals recorded in slant tracks.

It is yet another object of the present invention to provide an apparatus, as aforesaid, which will automatically reproduce the audio signals from a video tape recording without regard to whether the audio signals are recorded in longitudinal tracks and/or slant tracks.

Still another object of the present invention is to provide an apparatus, as aforesaid, which will record audio signals in slant tracks on magnetic tape and yet also permit audio signals to be subsequently recorded on the magnetic tape to replace the first recorded audio signals.

According to an aspect of the present invention, a video and audio reproducing apparatus comprises an audio signal processing means for reproducing at least one audio signal recorded in at least one longitudinally disposed track on a magnetic record medium, a mixed signal processing means for reproducing the audio signal from first and second mixed audio and video signals recorded in first and second adjacent slant tracks, respectively, on the magnetic record medium, and a detecting means for detecting when the audio signal is included in the signals recorded in the slant tracks on the magnetic record medium and for selecting the audio signal from the mixed signal processing means when the audio signal is reproduced thereby and for selecting the audio signal from the audio signal processing means at all other times.

The above, and other objects, features and advantages of the present invention will be apparent from the following detailed description of illustrative embodiments thereof which is to be read in conjunction with the accompanying drawings.

BRIEF DESCRIPTION OF THE DRAWINGS

FIG. 1 is a diagram illustrating the frequency spectrum of the chrominance and luminance components of a composite video signal;

FIG. 2 is a diagrammatic view of a section of magnetic tape illustrating the record tracks thereon in which video and audio signals are recorded in accord with the frequency spectrum of FIG. 1;

FIG. 3 is a diagram illustrating the frequency spectrum of frequency-modulated audio signals together with the chrominance and luminance components of a composite video signal and to which reference will be made in explaining the various operations of the present invention;

FIG. 4 is a diagramatic view of a section of magnetic tape illustrating the record tracks thereon in which audio and video signals are recorded in accord with the frequency spectrum of FIG. 3;

FIG. 6 is a diagram illustrating the frequency shift which occurs in the luminance component of a composite video signal when audio signals are frequency modulated and mixed therewith;

FIG. 7 is a view of the bottom of a cassette housing with a removable tab associated therewith which indicates when the audio signals are frequency modulated together with the composite video signal;

FIG. 8 is a cross-section of the cassette housing of FIG. 7 taken along the lines 8—8 and illustrating the relationship between the removable tab and a micro switch;

FIG. 9 illustrates the operation of the microswitch of FIG. 8 in which the removable tab has been removed from the cassette from the cassette housing; and FIGS. 10A and 10B are block diagrams illustrating an alternate embodiment of an audio and video signal reproducing apparatus in accord with the present invention.

DESCRIPTION OF THE PREFERRED EMBODIMENTS

Figure 5A:
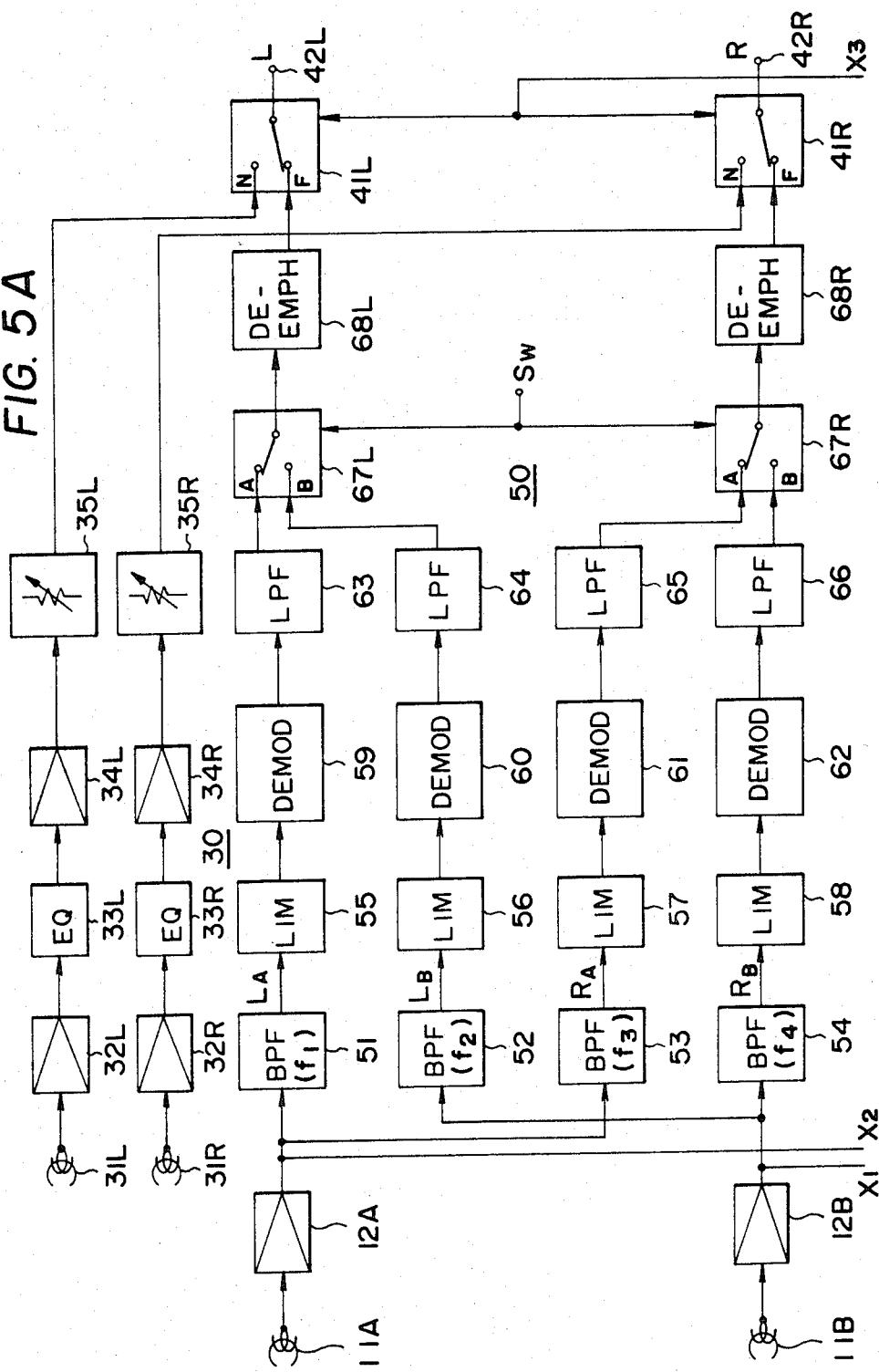
FIGS. 5A and 5B are block diagrams illustrating an embodiment of an audio and video signal reproducing apparatus in accord with the present invention.

Referring to the drawings in detail, and initially to FIG. 1 thereof, a composite color video signal is comprised of a luminance component $Y_F$ and a chrominance component $C_L$. In prior art video signal recording apparatuses, the chrominance signal $C_L$ is frequency converted and recorded on magnetic tape about a central frequency $f_C$. The frequency-modulated luminance signal $Y_F$ is recorded about a central frequency of, for example, approximately 4.2 MHz.

From FIG. 1, it is to be appreciated that the level of the recorded signal within the band with $B_S$ is relatively lower than the level of the frequency converted chrominance signal $C_L$ and the frequency-modulated luminance signal $Y_F$.

In FIG. 2, magnetic tape 1N has recorded thereon successive slant tracks $T_A$, $T_B$ including therein the video signals recorded by successive video heads A, B (not shown). With reference to FIG. 1, the video signal recorded in tracks $T_A$ includes the frequency converted chrominance signal $C_L$ and the frequency-modulated luminance component $Y_F$. In the prior art recording, first and second audio signals are recorded in first and second longitudinally disposed tracks $T_L$ and $T_R$ on magnetic tape 1N. The first and second audio signals can represent, in one embodiment, the left and right stereophonic channel signals which are employed for reproducing stereophonic sound.

Control signals are also recorded in a longitudinally disposed track $T_C$ along an edge of magnetic tape 1N opposite the audio signal tracks $T_L$ and $T_R$. The control signals recorded in control signal track $T_C$ may include, for example, synchronizing pulses for use in reproducing the video signals recorded in video tracks $T_A$ and $T_B$.

FIG. 3 illustrates the frequency spectrum of a composite color video signal mixed with left and right channel stereophonic signals, as disclosed, for example, in copending applications Ser. No. 06/447,875, filed Dec. 8, 1982, now, U.S. Pat. No. 4,490,751, and Ser. No. 06/447,874, filed Dec. 8, 1982, now U.S. Pat. No. 4,492,986, and assigned to the assignee of the present application. As disclosed in those applications, the left channel signal is frequency-modulated with a carrier having a frequency $f_1$, for example, of 1.325 MHz so as to provide a frequency modulated left channel signal $L_A$ having a frequency shift or deviation of the carrier of about 100 to 150 KHz. The left channel signal is then modulated with a carrier having a frequency $f_2$, for example, of 1.475 MHz, which is higher than the frequency $f_1$ so as to provide another frequency-modulated left channel signal $L_B$ having the same frequency shift or deviation as the first FM audio signal, that is, a frequency deviation of about 100 to 150 KHz, but around a different central frequency. The right channel frequency is frequency-modulated about a carrier having a frequency $f_3$, for example, of 1.625 MHz, higher than the frequency $f_2$, and a carrier having a frequency $f_4$, for example, of 1.775 MHz, higher than the frequency $f_3$. The frequency-modulators also provide a frequency shift width or deviation of the respective carriers of about 100 to 150 KHz and provide frequency-modulated right channel signals $R_A$, $R_B$ which have frequency shift or deviation bands different from each other and also different from the frequency shift or deviation bands of the first and second FM audio signals $L_A$ and $L_B$, respectively, as shown in FIG. 3.

The levels of the FM audio signals $L_A$, $L_B$, $R_A$, $R_B$ are suitably adjusted so as to have successively increasing values, that is, so that $L_A < L_B < R_A < R_B$, as shown in FIG. 3, in which the abscissa represents the frequency f and the ordinate represents the level of the frequency modulated audio signals. It will be apparent that these signals, $L_A$, $L_B$, $R_A$, $R_B$ are sequentially arranged with the same difference or interval between their respective central frequencies, and with the respective frequency shift bands or deviation ranges of the adjacent FM audio signals being very close to each other, or even slightly overlapping, so that the entire frequency band comprising the FM audio signals $L_A$, $L_B$, $R_A$, $R_B$ is relatively narrow.

It will be seen that the frequency $f_C$ of the color subcarrier of the frequency-converted chrominance signal $C_L$ has a sufficiently low value, for example, 688 KHz, so that the resulting low frequency band of chrominance signal $C_L$ will be below the band of the first FM audio signal $L_A$ having the previously mentioned central frequency $f_1$ of 1.325 MHz. Further, when frequency converted chrominance signal $C_L$ and frequency-modulated luminance signal $Y_F$ constituting a composite color video signal are recorded along with the FM audio signals $L_A$, $R_A$ in slant tracks $T_A$, and along with FM audio signals $L_B$, $R_B$ in slant tracks $T_B$, respectively, the central frequency of the carrier to be modulated by the luminance component $Y_F$ is selected, for example, to be about 4.6 MHz, and the modulation degree is selected so that, in the resulting frequency-modulated luminance signal $Y_F$, the sync signal of the luminance component corresponds to a frequency of approximately 4.0 MHz, which is substantially higher than the central frequency $f_4$ of FM audio signal $R_B$. The white peak or maximum amplitude of the luminance component corresponds to, for example, 5.2 MHz, which is higher than the frequency of the sync signal by a predetermined amount, that is, by 1.2 MHz in the example given. It will be appreciated from FIG. 3 that, with such exemplary values given for the color sub-carrier frequency $f_C$ of the frequency-converted chrominance signal $C_L$, and for the frequencies of the white peak and the sync signal of the frequency-modulated luminance signal $Y_F$, the resulting composite color video signal to be recorded in tracks $T_A$ and $T_B$ has a gap or space in its spectrum between the frequency-converted chrominance signal $C_L$ and the frequency-modulated luminance signal $Y_F$ for accommodating the FM audio signals $L_A$, $L_B$, $R_A$, $R_B$.

Further, as shown in FIG. 3, the level of the frequency-converted chrominance signal $C_L$ is selected to be larger than the levels of all of the FM audio signals $L_A$, $L_B$, $R_A$, $R_B$, and the level of the frequency-modulated luminance signal $Y_F$ is selected to be larger than the level of chrominance signal $C_L$. It will be appreciated that the sequentially arranged left FM signals $L_A$, $L_B$ and the right FM signals $R_A$, $R_B$ are located close to one another in the space or gap between the bands of the frequency-converted chrominance signals $C_L$ and the frequency-modulated luminance signal $Y_F$ so as to minimize, as much as possible, the gap that needs to be provided between the chrominance and luminance signals $C_L$ and $Y_F$ of the composite video signal and compression of the latter required for accommodating the FM audio signals $L_A$, $L_B$, $R_A$, $R_B$.

With reference to FIG. 4, non-adjacent FM audio signals are mixed with chrominance and luminance components $C_L$ and $Y_F$, respectively, and are alternately recorded in tracks $T_A$. Corresponding, non-adjacent FM audio signals $L_B$, $R_B$ are mixed with chrominance and luminance components $C_L$, $Y_F$, respectively, and are alternately recorded in tracks $T_B$. It will be appreciated that, in the illustrative embodiment, the FM audio signals recorded in each track $T_A$, that is, the left FM audio signal $L_A$ and the right FM audio signal $R_A$ do not have adjacent frequency bands. Similarly, the FM audio signals recorded in each track $T_B$, that is, the left FM audio signal $L_B$ and the right FM audio signal $R_B$ do not have adjacent frequency bands. Further, it will be appreciated that the FM audio signals $L_A$, $R_A$ are recorded in each track $T_A$ by a rotary head A with an azimuth angle different from that with which the rotary head B records the FM audio signals $L_B$, $R_B$ in each track $T_B$. Furthermore, the carrier frequencies $f_1$ and $f_3$ and the carrier frequencies $f_2$ and $f_4$ of the FM audio signal recorded in the adjacent slant tracks $T_A$, $T_B$, respectively, do not coincide.

At the same time that the FM audio signals are being recorded along with the composite color video signal in slant tracks $T_A$ and $T_B$ by means of rotary heads A and B, (not shown), the video and audio signal recording apparatus may also record the left and right channel signals in the longitudinal tracks $T_L$ and $T_R$ by means of fixed heads (not shown) so that the tape 1F thus recorded can be played back or is compatible with a conventional VTR in which only fixed heads are provided for reproducing the recorded audio signals.

In respect to the FM audio signals recorded with the frequency-converted chrominance signal $C_L$ and the frequency-modulated luminance signal $Y_F$ by the rotary magnetic heads in the slant tracks $T_A$ and $T_B$, it will be appreciated that, since the relative speed of the rotary heads with respect to magnetic tape 1F is selected to be sufficiently high for recording the video signal, such high relative speed insures high quality recording of the audio signals, such as the stereophonic left channel signal and right channel signal, while using a narrow frequency band for the corresponding FM audio signals $L_A$, $L_B$, $R_A$, $R_B$ for preventing suppression of the frequency band of the composite color video signal.

Figure 5B:
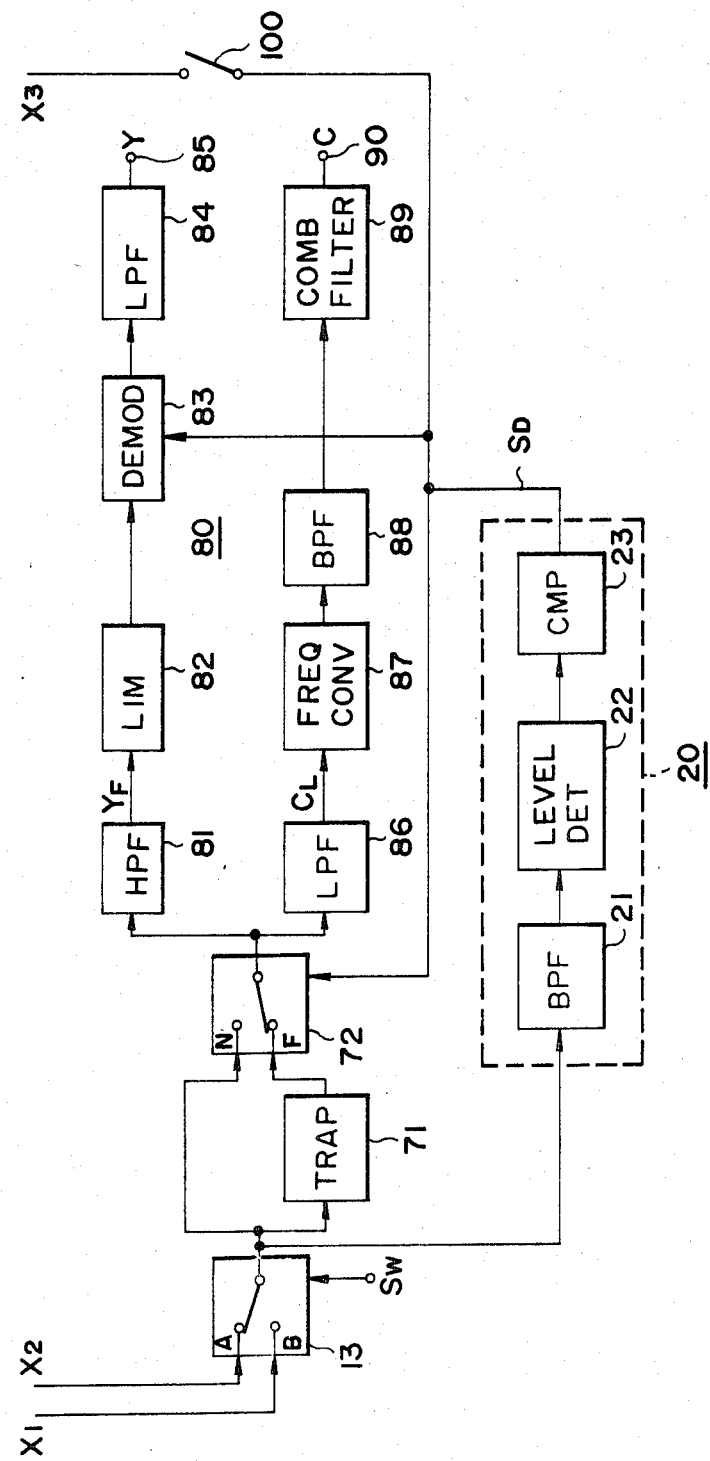

FIGS. 5A and 5B illustrate an embodiment of a video and audio signal reproducing apparatus in accord with the present invention and is shown to include rotary magnetic heads 11A, 11B which are operative alternately to scan the slant tracks $T_A$ and $T_B$ formed on magnetic tape 1F by a suitable recording apparatus. The movements of rotary heads 11A, 11B are suitably controlled, for example, by a known servo system (not shown), so that, during one field, head 11A scans a slant track $T_A$ and, during the next field, the other rotary magnetic head 11B scans an adjacent slant track $T_B$. Since the head 11A has an azimuth angle corresponding to that of a magnetic head with which a mixed audio and video signal was recorded in slant track $T_A$ and head 11B has an azimuth angle corresponding to that of a magnetic head with which a mixed audio and video signal was recorded in slant track $T_B$, magnetic head 11A mainly reproduces the first mixed signal from the scanned track $T_A$ and the second mixed signal is mixed therewith only as a cross talk component from the adjacent tracks $T_B$. On the other hand, magnetic head 11B mainly reproduces the second mixed signal from the track $T_B$ being scanned, while the first mixed signal is mixed therewith only as the cross talk component from the adjacent tracks $T_A$. The output signals from heads 11A and 11B are respectively supplied through reproducing amplifiers 12A and 12B to a mixed signal processing circuit 50 and through a switch 13 to a video signal processing circuit 80 which is effective to separate the frequency-converted chrominance signal $C_L$ and the frequency-modulated luminance signal $Y_F$ from each of the mixed signals and then to reconvert the chrominance signal to its original frequency band and to demodulate the frequency-modulated luminance signal. Switch 13 is actuated in response to a switch control signal $S_W$ which can be supplied in response to control signals recorded in control signal track $T_C$.

Of course, if the chrominance signal has been recorded with different first and second carriers in the adjacent tracks $T_A$ and $T_B$, for example, as disclosed in U.S. Pat. No. 4,007,482 and U.S. Pat. No. 4,007,484, then the video signal processing circuit 80 may be arranged as shown in either of those patents for suppressing or eliminating the low frequency band of cross talk between tracks $T_A$ and $T_B$ by reason of the different frequency and/or polarity or phase characteristics of the respective carriers.

The output signal of head 11A, as obtained from reproducing amplifier 12A, is also supplied to bandpass filters 51 and 53 which respectively pass therethrough the left FM signal $L_A$ and the right FM signal $R_A$. Although such left FM signal $L_A$ and right FM signal $R_A$ in the output signal from head 11A are reproduced from the same slant track $T_A$, the frequency bands of such signals $L_A$ and $R_A$ are spaced from each other, that is, are not immediately adjacent, as is apparent from FIG. 3, so that such FM audio signals $L_A$ and $R_A$ can be satisfactorily separated from each other by bandpass filters 51 and 53. Thus, bandpass filters 51 and 53 deliver the left FM signal $L_A$ and the right FM signal $R_A$, respectively, without mixing therewith any substantial cross talk component of the other. Similarly, the output signal of head 11B, as obtained from reproducing amplifier 12B, is supplied to bandpass filters 52 and 54 which respectively permit the left FM signal $L_B$ and the right FM signal $R_B$ to pass therethrough. Although such FM audio signals $L_B$ and $R_B$ in the output signal from head 11B are also reproduced from the same slant track $T_B$, their frequency bands are also spaced from each other, as shown on FIG. 3, and such signals can be effectively separated from each other by bandpass filters 52 and 54. Thus, bandpass filters 52 and 54 provide, at their outputs, the left FM signal $L_B$ and the right FM signal $R_B$, respectively, with each such signal being essentially free of any cross talk component from the other.

The left FM signals $L_A$ and $L_B$ and the right FM signals $R_A$ and $R_B$ obtained from bandpass filters 51 and 52 and bandpass filters 53 and 54, respectively, are supplied through amplitude limiters 55, 56, 57 and 58, respectively, to corresponding frequency demodulators 59, 60, 61 and 62. It will be appreciated that, during the reproduction of the fields of the video signal recorded in slant tracks $T_A$, portions of the demodulated and reproduced left and right channel signals, respectively, appear at the outputs of demodulators 59 and 61, respectively. On the other hand, during the reproduction of fields of the video signal recorded in tracks $T_B$, portions of the demodulated and reproduced left and right channel signals, respectively, appear at the the outputs of frequency demodulators 60 and 62. Such output signals of frequency demodulators 59, 60, 61 and 62 are passed through low pass filters 63, 64, 65 and 66, respectively, which are each designed to pass the audio signal band. The purpose of the low pass filters 63-66 is to remove from the audio signals supplied thereto any beat noises that may occur in the output signals of frequency demodulators 59-62 due to the existence of cross talk components in the signals reproduced by heads 11A and 11B.

More particularly, each of the left FM signals $L_A$ and $L_B$ and the right FM signals $R_A$ and $R_B$ derived from bandpass filters 51-54, respectively, may contain cross talk components of an FM audio signal reproduced from the adjacent slant tracks and having a frequency band which is close to that of the main FM audio signal being passed through the respective one of filters 51-54. In other words, the left FM signal $L_A$ passed through bandpass filter 51, as a main signal, may also contain, as a cross talk component, the left FM signal $L_B$; the left FM signal $L_B$ passed through bandpass filter 52, as a main signal, may also contain, as cross talk components, the left FM signal $L_A$ and the right FM signal $R_A$; the right FM signal $R_A$ passed, as a main signal, through bandpass filter 53 may also contain, as cross talk components, the left FM signal $L_B$ and the right FM signal $R_B$; and the right FM signal $R_B$ passed, as a main signal, through bandpass filter 54 may also contain, as a cross talk component, the right FM signal $R_A$. However, since such cross talk components from the adjacent tracks have the levels thereof reduced by the reproduction azimuth losses, and further, since the cross talk components supplied, along with the respective main signals, to the bandpass filters 51-54 have frequency bands which are not coincident with the frequency pass bands of the respective bandpass filters, the levels of the cross talk components, as applied to frequency demodulators 59-62, are quite low for reducing the influences for such cross talk components. However, even such low level cross talk components, when mixed in the signals applied to the inputs of frequency demodulators 59-62, cause beating to occur between the main channel signals and the cross talk components and, accordingly, beat noises are produced in the output signals from frequency demodulators 59-62. However, the carrier frequencies $f_1$, $f_2$, $f_3$ and $f_4$ of the FM audio signals $L_A$, $L_B$, $R_A$ and $R_B$, respectively, have been selected so that the difference between the adjacent carrier frequencies, for example, 150 KHz, and hence the frequency of the described beat noise, will be outside the reproduced audio signal band passed by low pass filters 63-66. Thus, any beat noises appearing at the outputs of frequency demodulators 59-62 are removed by filters 63-66, respectively.

In view of the above, portions of the reproduced left channel signal, without any components of the right channel signal or any beat noise mixed therewith, are provided at the outputs of low pass filters 63 and 64 in alternating fields of the video signal. Similarly, portions of the reproduced right channel signal, without any components of the left channel signal or any beat noise mixed therewith, are provided at the outputs of low pass filters 65 and 66 during alternating fields of the reproduced video signal.

The portions of the reproduced left channel signal obtained from low pass filters 63 and 64, as described above, are alternately passed through a switch circuit 67L which is changed over at each video field period in response to a control signal $T_C$ reproduced by a fixed head (not shown) from the track $T_C$ on tape 1F and being supplied as switch control signal $S_W$ to switch circuit 67L. Thus, a continuous reproduced left channel signal is obtained from the output of switch circuit 67L. Similarly, the portions of the right channel signal obtained from low pass filters 65 and 66 in alternating fields of the video signal are alternately passed through a switch circuit 67R under the control of switch control signal $S_W$ so that a continuous reproduced right channel signal is obtained at the output of switch circuit 67R. Such continuous or successive reproduced left and right channel signals obtained from the outputs of switch circuits 67L and 67R are passed through de-emphasis circuits 68L and 68R, respectively, which are complementary to pre-emphasis circuits in the recording apparatus (not shown) and include low pass filters (also not shown). The resulting left and right channel audio output signals are supplied to terminals F of switching circuits 41L and 41R, respectively, and thence, to audio output terminals 42L and 42R. Switching circuits 41L and 41R are provided for selectively supplying to the respective audio output terminals 42L and 42R either the reproduced continuous or successive left and right channel signals from the slant tracks $T_A$ and $T_B$ as reproduced by rotary heads 11A and 11B, as described above, or the left and right channel signals reproduced by fixed heads 31L and 31R from the conventional longitudinal audio tracks $T_L$ and $T_R$ on the tape 1F and which are supplied to terminals N of switching circuits 41L and 41R from a conventional audio signal processing circuit 30, to be described more fully hereinbelow.

Audio signal processing circuit 30 includes stationary audio reproducing heads 31L and 31R, as described above, for reproducing conventionally recorded left and right stereophonic channel signals in tracks $T_L$ and $T_R$ on tape 1F. The output signals from heads 31L and 31R are respectively supplied to amplifiers 32L and 32R, equalizing circuits 33L and 33R (complementary to pre-emphasis circuits in the recording apparatus (not shown)), second amplifiers 34L and 34R, and variable gain control circuits 35L and 35R. The output signals from variable gain control circuits 35L and 35R are respectively supplied to terminals N of switching circuits 41L and 41R, as described before.

It will be seen that, in the reproducing apparatus according to this invention, switch circuits 67L and 67R are located after frequency demodulators 59 and 60 and frequency demodulators 61 and 62, respectively. Thus, switch circuits 67L and 67R act to combine or join successive portions of the demodulated, relatively low frequency signals. Such relatively low frequency or audio signals can be combined relatively easily without large junction errors. However, even if such junction errors do occur, due to, for example, an angular deviation from the desired diametrically opposed relation of rotary heads 11A and 11B and a corresponding phase difference between the demodulated signal portions, each such junction error involves an abrupt or high frequency change in the combined signal and thus is substantially eliminated by the previously mentioned low pass filter conventionally included in de-emphasis circuit 68L and 68R. Accordingly, even if there is a junction error, for example, in the combined signal issuing from switch circuit 67L, the corresponding combined signal derived from de-emphasis circuit 68L will be substantially smoothed at the location of the junction error.

It will be appreciated from the foregoing that the recording and reproducing of video and audio signals according to this invention is compatible with the high density recording of the video signal, for example, by using any of the techniques disclosed in U.S. Pat. Nos. 4,007,482 and 4,007,484, and that, by employing the rotary magnetic heads for recording and reproducing the frequency modulated audio signals together with the video signal, the high quality recording and reproducing of the audio signal is ensured. More particularly, the recording and reproducing of the audio signal in an apparatus according to this invention overcomes a problem encountered with the audio reproduction or playback in a conventional VTR when the latter is operated in its slow motion or other so-called "trick" mode. In the conventional VTR in which the audio signals are recorded only in the longitudinal tracks $T_L$ and $T_R$ extending along the tape 1N and are reproduced by fixed heads, the head-to-tape speed is very substantially reduced in the slow-motion playback or reproducing mode with the result that the tones or frequencies of the reproduced audio are drastically altered and the audio becomes substantially unintelligible. On the other hand, in the apparatus according to the present invention, since the FM audio signals are recorded in the slant tracks $T_A$ and $T_B$ along with the video signal and are reproduced by the rotary heads 11A and 11B, the reduction in the tape speed for the slow-motion playback mode changes the rate at which recorded words are uttered, but does not substantially change the head-to-tape speed for the rotary heads 11A and 11B so that the frequencies and tones of the reproduced audio are not substantially changed and the relatively slowly uttered words or sounds thereof can still be understood.

It will also be seen that, since the left and right channel audio signals are converted into the narrow band frequency-modulated signals $L_A$, $L_B$, $R_A$ and $R_B$ for recording, only a relatively narrow frequency band is required for such FM audio signals and the band of the video signal is not significantly suppressed. Further, as previously described, during playback, the left and right channel signals are reproduced with sufficient separation therebetween and with any cross talk interference from adjacent tracks being eliminated or at least considerably reduced.

Furthermore, since the described embodiment of the invention includes fixed heads 31L and 31R for reproducing the audio signals in the conventional longitudinal tracks $T_A$ and $T_B$ on tape 1F, any tape on which video and audio signals have been recorded can be played back in a conventional video and audio signal reproducing apparatus having fixed audio reproducing heads.

The output signals from amplifiers 12A, 12B are supplied to switching circuit 13 and thence, to a second switching circuit 72. When the FM audio signals are mixed with the video signals, the signals from switch 13 are supplied through a trap 71 to a terminal F of switching circuit 72. Trap 71 substantially eliminates the FM audio signals when they are present in the reproduced signals from amplifiers 12A, 12B. The reproduced signals from amplifiers 12A, 12B are also supplied to a terminal N of switching circuit 72. Thus, switching circuit 72 is switched to terminal N to supply a video signal to video signal processing circuit 80 when the FM audio signals are not mixed with the video signal, and is switched to terminal F when the FM audio signals are mixed with the video signal. Switching circuit 72 is actuated in response to a switch control signal $S_D$ provided from a recording condition detector circuit 20, and more fully described hereinbelow.

Video signal processing circuit 80 includes a high pass filter 81 for eliminating chrominance signal component $C_L$ from the video signal supplied thereto. Luminance signal $Y_F$ thus supplied to a limiting circuit 82 and thence, to a frequency demodulator 83. Frequency demodulator 83 demodulates luminance signal $Y_F$ in accord with control signals supplied from recording condition detector circuit 20, as, more fully described hereinbelow, and varies the central frequency about which luminance signal $Y_F$ is demodulated. The demodulated luminance signal $Y_F$ is supplied from FM demodulating circuit 83 to a low pass filter 84 and thence, to a luminance signal output terminal 85.

The signal from switching circuit 72 is also supplied to a low pass filter 86 which removes the luminance signal component $Y_F$ from the reproduced video signal and accordingly supplies chrominance signal component signal $C_L$ to a frequency converting circuit 87.

Frequency converting circuit 87 converts the frequency of chrominance signal component signal $C_L$ to its original frequency and supplies a corresponding signal to a bandpass filter 88. The output signal from bandpass filter 88 is supplied to a comb filter 89. The chrominance signal from comb filter 89 is supplied to a chrominance signal output terminal 90.

Recording condition detector circuit 20 receives the output signal from switching circuit 13 and determines whether the reproduced signal from rotary heads 11A, 11B includes the audio and video signals mixed together. The output signal from switching circuit 13 is supplied to a bandpass filter 21 which passes only the frequency band $B_S$ (see FIG. 3), i.e., substantially only the frequency band within which the FM audio signals are carried. The filtered signal is then supplied to a level detecting circuit 22 which determines the level of the frequency band supplied thereto. It is to be appreciated from FIGS. 1 and 3 that the level of the frequency band $B_S$ is substantially lower when the FM audio signals are not mixed with the video signals then when the FM audio signals are mixed with the video signals. Recording condition detector circuit 20 utilizes this fact to generate a control signal $S_D$ which is supplied to switching circuit 72, FM demodulating circuit 83, and switching circuits 41L, 41R to select the appropriate audio signals from audio signal processing circuit 30 and mixed signal processing circuit 50. The detected level signal from level detecting circuit 22 is supplied to a comparator 23 which compares the detected level with a reference value. When the detected level exceeds the reference value, control signal $S_D$ is generated in response thereto.

It is to be appreciated that the circuit of FIG. 5 will automatically identify whether the FM audio signals are mixed with the video signals and select the FM audio signals for reproduction from the mixed signals. If the audio signals are not mixed with the video signals, the circuit of FIG. 5 will select the audio signals from the audio signal processing circuit 30 which derives the audio signals from the stationary heads 31L, 31R.

It is sometimes desirable to change the audio signals recorded on the magnetic tape subsequent to the recording of the video signals thereon. Such an operation is referred to as "audio dubbing". When the audio signals are mixed with the video signals and recorded on the magnetic tape, it is not practical to re-record over or otherwise replace the audio signals in the slant tracks. Accordingly, it is necessary to record in the longitudinal tracks $T_L$, $T_R$ when an audio dubbing operation is to be performed. When the magnetic tape includes such audio dubbed signals, it is necessary to disable the switching operation actuated by control signal $S_D$ from recording condition detector circuit 20. Otherwise, the reproducing apparatus in accord with the present invention selects the audio signals mixed with the video signals. Thus, an audio dubbing switch 100 is interposed between recording condition detector circuit 20 and switching circuits 41L, 41R so that control signal $S_D$ is not supplied to actuate switching circuits 41L, 41R. If switching circuits 41L, 41R are designed whereby they are switched to terminals N when control signal $S_D$ is not supplied thereto, the audio signals reproduced by audio signal processing circuit 30 will be supplied to audio output terminals 42L, 42R. It is to be appreciated that control signal $S_D$ must be supplied to FM demodulating circuit 83 even when an audio dubbing operation has been performed so that the central frequency about which the luminance component signal $Y_F$ is modulated can be changed accordingly.

FIG. 6 diagrammatically illustrates the shift in the central frequency of luminance component signal $Y_F$ between the normal recording mode and the special recording mode in which the audio signals are mixed with the video signals for recording together. In the normal recording mode, the central frequency is approximately 4.2 MHz, while in the special recording mode, the central frequency is shifted approximately 0.4 MHz to 4.6 MHz. In both cases, the band width is approximately 1.2 MHz.

FIG. 7 illustrates a cassette housing 3 which contains magnetic tape. Cassette housing 3 has a lower surface $3a$ which has formed therein removable tabs 4, 5. Removable tab 4 is provided, as is known, to indicate whether the magnetic tape can be erased or not erased. Removable tab 4 is sometimes referred to as an erase protector.

The second removable tab 5 indicates whether the magnetic tape housed in cassette housing 3 is recorded in the normal or in the special recording mode. For example, removable tab 5 can be removed to indicate that the magnetic tape is recorded in the special recording mode in which the audio and video signals are mixed together.

FIGS. 8 and 9 illustrate the interaction of removable tab 5 and a microswitch 7 in order to indicate whether the magnetic tape is recorded in the normal or in the special recording mode. Microswitch 7 includes a portion $7a$ which is normally upwardly biased by, for example, a spring. Portion $7a$ coacts with an upstanding pin 8 which contacts removable tab 5. When removable tab 5 is included with cassette housing 3, as, for example, indicated in FIG. 8, microswitch 7 is placed in one state or condition to indicate the recording mode of the magnetic tape in cassette housing 3. As illustrated in FIG. 9, when removable tab 5 is removed, portion $7a$ is placed in a second state or mode to indicate through microswitch 7 the alternate recording mode.

Accordingly, when a video cassette constructed in accord with the embodiment of FIG. 7 is inserted in an audio and video signal reproducing apparatus, the condition of removable tab 5 indicates whether the magnetic tape housed therein is recorded in the normal or in the special recording mode. Microswitch 7 can, for example, actuate a circuit to select the source of the audio signals from either the stationary heads or the rotary heads.

Figure 10A:
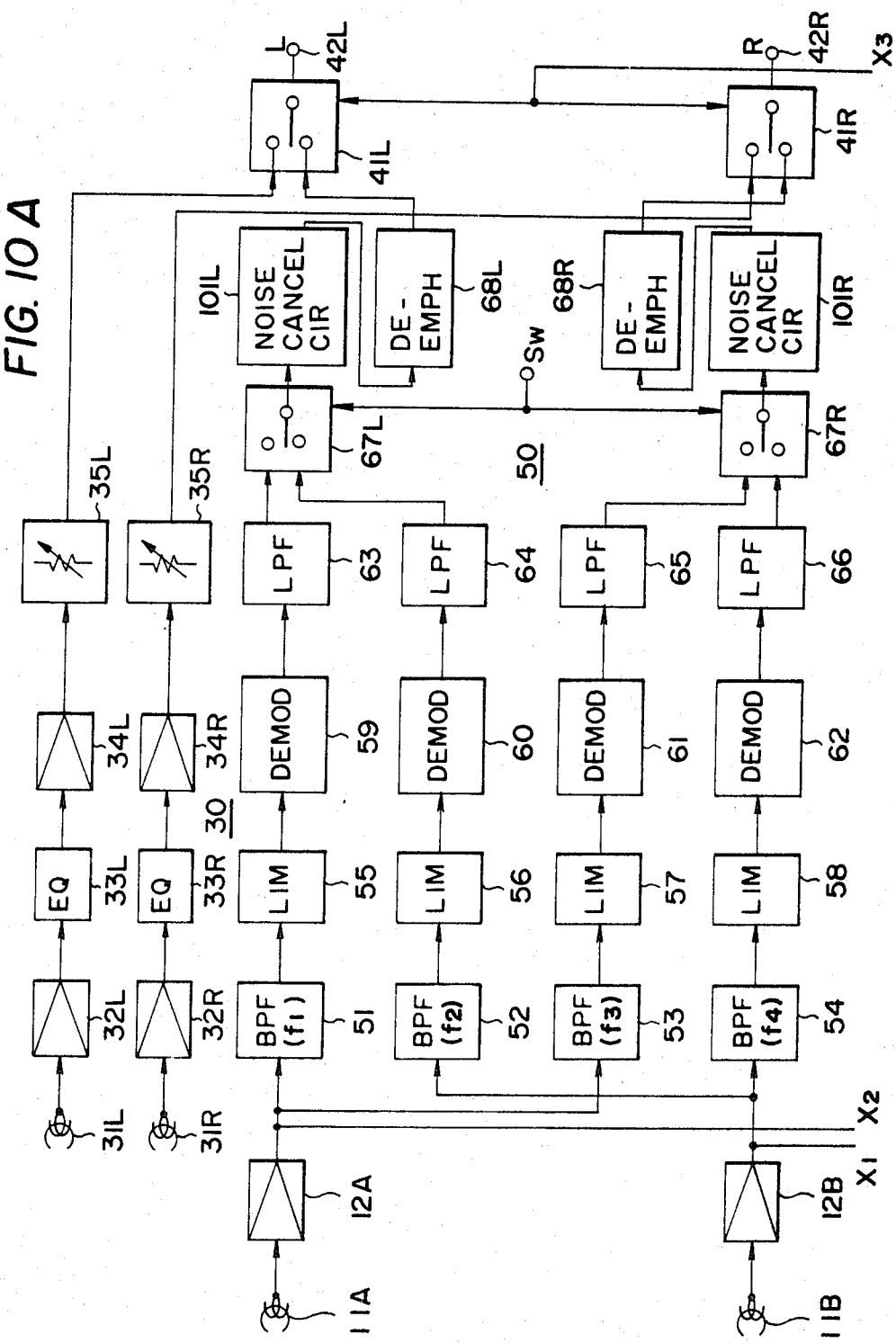

FIGS. 10A and 10B illustrate an additional embodiment of the present invention in which similar parts or elements described previously with respect to the other embodiments operate as aforesaid and are not described herein for brevity. It is to be appreciated that mixed signal reproducing circuit 50 includes noise cancelling circuits 100L, 100R interposed between switching circuits 67L, 67R and de-emphasizing circuits 68L, 68R, respectively.

In the embodiment of FIGS. 10A and 10B, a pair of level detectors 71, 72 receive the output signals from amplifiers 12A, 12B, respectively, and generate an output signal in response thereto. The output signals from level detectors 71, 72 are supplied to an OR gate 73 which generates an output signal in response to the input signals. The output signal from OR gate 73 is supplied to a control signal generator 74 which generates output signal $S_D$ to actuate switching circuits 41L, 41R, as aforesaid. The output signals from amplifiers 12A, 12B are also supplied to video signal reproducing circuit 80 which supplies luminance and chrominance signals, respectively, to luminance and chrominance output terminals 85, 90.

In the embodiment of FIGS. 10A and 10B, when a drop-out of the audio signal mixed with the video signal is detected by level detectors 71, 72, control signal generator 74 generates control signal $S_D$ in response thereto to actuate switching circuits 41L, 41R and reproduce the audio signals from audio signal processing circuit 30. Accordingly, even if a drop-out occurs, the audio signal is continuously reproduced.

It is to be appreciated that a VTR in accord with the foregoing can utilize a video tape recording for a conventional VTR since it can reproduce audio signals from both the longitudinal tracks and the slant tracks, and will automatically select the audio signals recorded in the longitudinal tracks if the audio signals are not recorded in the slant tracks. Further, a VTR in accord with the foregoing permits "audio dubbing" of video tape recordings where the audio signals are recorded in the slant tracks.

Having specifically described the illustrative embodiments of this invention with reference to the accompanying drawings, it is to be understood that the invention is not limited to those precise embodiments, and that various changes and modifications, among which several have been mentioned, may be effected therein by one skilled in the art without departing from the spirit or scope of the invention as defined in the appended claims.

What is claimed is:

1. A video and audio signal reproducing apparatus comprising:
   audio signal processing means for reproducing at least one audio recorded in at least one longitudinally disposed track on a magnetic record medium;
   mixed signal processing means for reproducing said audio signal from first and second mixed audio and video signals recorded with said audio and video signals in frequency interleaved relationship in first and second adjacent slant tracks, respectively, on said magnetic record medium;
   detecting means for detecting when said audio and video signals are recorded in said frequency interleaved relationship in said slant tracks on said magnetic record medium; and
   means for selecting said audio signal from said mixed signal processing means when said audio signal is reproduced thereby and for selecting said audio signal from said audio signal processing means at all other times.

2. The apparatus of claim 1; wherein said magnetic record medium is positioned in a housing having an indicator portion for indicating whether said audio signal is mixed with said first and second video signals, and wherein said detecting means cooperates with said indicator portion to select said audio signal from said mixed signal processing means.

3. The apparatus of claim 2; wherein said detecting means includes switch means for coacting with said indicator portion of said housing.

4. The apparatus of claim 3; wherein said indicator portion of said housing is a removable tab means.

5. The apparatus of claim 4, in which said housing has a lower surface; and wherein said removable tab means is associated with said lower surface.

6. A video and audio signal reproducing apparatus comprising:
   audio signal processing means for reproducing at least one audio signal recorded in at least one longitudinally disposed track on a magnetic record medium;
   mixed signal processing means for reproducing said audio signal from first and second mixed audio and video signals recorded in first and second adjacent slant tracks, respectively, on said magnetic record medium;
   detecting means for detecting when said audio signal is included in said signals recorded in said slant tracks on said magnetic record medium, said detecting means including level detecting means for detecting the level of said first and second mixed audio and video signals and generating a control signal in response thereto; and
   selecting means responsive to said control signal for selecting said audio signal from said mixed signal processing means when said audio signal is reproduced thereby and for selecting said audio signal from said audio signal processing means at all other times.

7. The apparatus of claim 6; wherein said level detecting means alternately receives said first and second mixed audio and video signals and generates control signals in response to said level of said first and second video signals.

8. The apparatus of claim 7, in which at least a portion of said first and second video signals are frequency modulated about a first central frequency when said at least one audio signal is mixed therewith and are frequency modulated about a second central frequency at all other times; and further comprising video signal processing means for receiving said control signals from said level detecting means and for demodulating said first and second video signals in response thereto.

9. The apparatus of claim 7; and further comprising switch means for selecting said audio signal from said audio signal processing means.

10. The apparatus of claim 9; wherein said switch means is manually operable.

11. The apparatus of claim 6, in which said audio signal is a frequency modulated signal which occupies a frequency band in said first and second mixed audio and video signals; and wherein said detecting means includes:
    band pass filter means for passing substantially only said frequency band of said audio signal;
    level detecting means for detecting the level of said frequency band; and
    comparator means for comparing said level of said frequency band with a predetermined level to identify when said audio signal is mixed with said first and second video signals.

12. The apparatus of claim 6; wherein said level detecting means includes first and second level detectors for respectively detecting the levels of said first and second mixed audio and video signals.

13. The apparatus of claim 12; wherein said level detecting means further includes:
    OR gate means connected to said first and second level detectors and generating an audio indicator signal in response to output signals therefrom; and
    control signal generating means for receiving said audio indicator signal and generating control signals to select said audio signal from said signal processing means.

14. A video and audio signal reproducing apparatus for use with a magnetic record medium having left and right stereophoic channel signals recorded in respective longitudinally disposed tracks on said magnetic record medium; and wherein said left and right stereophonic channel signals are frequency modulated by first, second, third, fourth carriers to provide first, second, third and fourth FM audio signals, said first and second FM audio signals being mixed with a first video signal to provide a first mixed audio and video signal and said third and fourth FM audio signals being mixed with a second video signal to provide a second mixed audio and video signal, said first and second mixed audio and video signals being recorded in first and second adjacent slant tracks, respectively, on said magnetic record medium, said apparatus comprising:

audio signal processing means for reproducing said audio signals recorded in said longitudinally disposed tracks on said magnetic record medium;

mixed signal processing means for reproducing said left and right stereophonic channel signals from said first and second mixed audio and video signals recorded in said first and second adjacent slant tracks, respectively, on said magnetic record medium;

detecting means for detecting when said left and right stereophonic channel signals are included in said signals recorded in said slant tracks on said magnetic record medium; and means for selecting said left and right stereophonic channel signals from said mixed signal processing means when said left and right stereophonic channel signals are reproduced thereby and for selecting said left and right stereophonic channel signals from said audio signal processing means at all other times.

15. The apparatus of claim 14; wherein said detecting means comprises:

band pass filter means for passing substantially only the frequency band of said first, second, third and fourth FM audio signals;

level detecting means for determining the level of said frequency band; and comparing means for comparing said level of said frequency band with a predetermined level and generating in response thereto control signals to select said left and right stereophonic channel signals from one of said audio signal processing means and said mixed signal processing means.

16. The apparatus of claim 15; and further comprising switch means connected to said audio signal processing means and said mixed signal processing means and actuated by said control signals from said comparing means for selecting said left and right stereophonic channel signals therefrom.

17. The apparatus of claim 14; wherein said detecting means comprises:

first and second level detecting means each associated with one of said first and second mixed audio and video signals for detecting the level thereof; and means connected to said first and second level detecting means for generating control signals in response to said levels of said first and second mixed audio and video signals to select said left and right stereophonic channel signals from one of said audio signal processing means and said mixed signal processing means.

18. The apparatus of claim 17; wherein said means for generating said control signals comprises:

OR gate means for receiving output signals from said first and second level detecting means corresponding to said levels of said first and second mixed audio and video signals and generating output signals in response thereto; and control signal generating means for receiving said output signals from said OR gate means and generating said control signals in response thereto.

19. The apparatus of claim 14; wherein said magnetic record medium is contained in a cassette housing, and wherein said detecting means coacts with a portion of said cassette housing to select said left and right stereophonic channel signals from one of said audio signal processing means and said mixed signal processing means.

20. The apparatus of claim 19; wherein said portion of said cassette housing is a removable tab means and said detecting means is a switch means actuated by said removable tab means.

21. The apparatus of claim 20, in which said cassette housing has a lower surface; and wherein said removable tab means is associated with said lower surface of said cassette housing.

* * * * *